Dec. 29, 1942. J. W. KINNUCAN 2,306,960
SHAFTING
Filed April 11, 1940
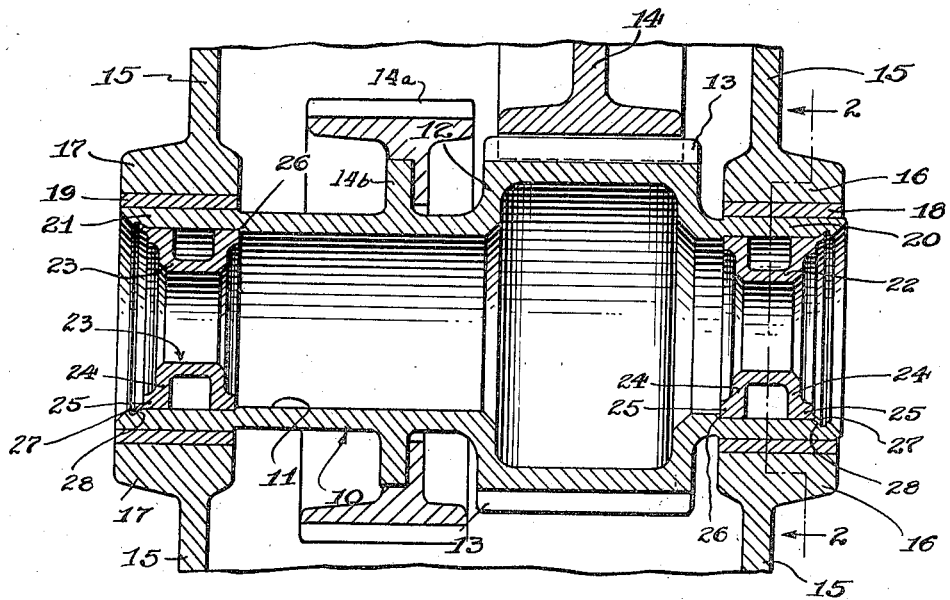
Fig. 1
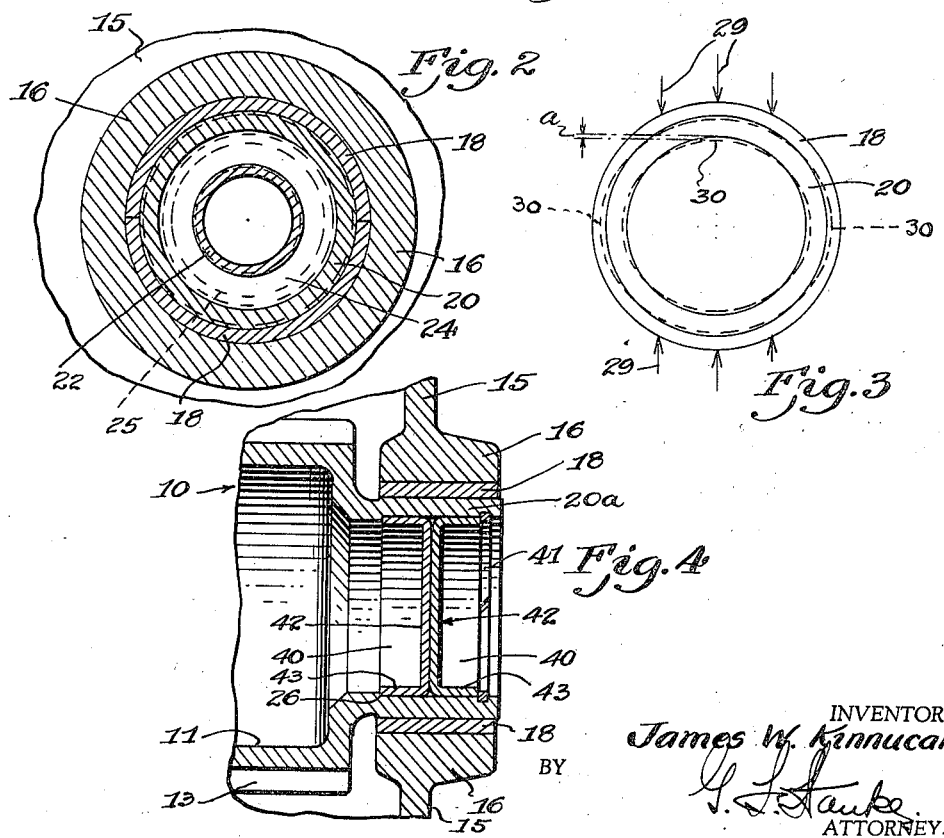
INVENTOR.
James W. Kinnucan
BY
ATTORNEY.

Patented Dec. 29, 1942

2,306,960

UNITED STATES PATENT OFFICE 2,306,960

SHAFTING

James W. Kinnucan, Detroit, Mich., assignor, by mesne assignments, to Continental Aviation and Engineering Corporation, a corporation of Virginia Application April 11, 1940, Serial No. 329,126

9 Claims. (Cl. 64—1)

My invention relates to shafting and more particularly to rotating shafts used in aircraft engines.

One of the prime essentials in aircraft engine design is to minimize on weight wherever possible. As a result, most all shafts employed in an aircraft engine are constructed of tubular material, or are otherwise bored out to lessen the weight of the shaft without decreasing its strength in withstanding loads and other forces to which it is subjected. It is well known that a tubular shaft or sleeve may transmit torque nearly as efficiently as a solid shaft and it is well known that a tubular shaft or sleeve will also present maximum resistance to bending forces. It is the practice, therefore, to employ such tubular shafts or sleeves in aircraft engines and to construct such shafts with as thin a wall section as is consistent with good engineering practices.

Many applications of a tubular shaft are to be found in aircraft engines, and one of said applications is the idler gear shaft employed in many reduction drives. These shafts are preferably constructed tubular with a relatively thin wall section of sufficient strength to carry the torque and to resist bending forces when mounted in suitable engine bearings. In large aircraft engines it is quite necessary to use shafts for supporting such gears of relatively large diameter in order to transmit the torque from a high output engine. Operation of these shafts in high output engines has shown that the excessive loading of the shaft at the bearings makes necessary the construction of a shaft with varying wall thicknesses and with a particularly thick section at the bearings in order to withstand compression loads which may reach as high as twenty thousand (20,000) pounds per square inch.

An object of my present invention is to construct a shaft, which is subjected to relatively high compression loads, of a relatively thin wall section for its entire length, but to eliminate the difficulties aforesaid by providing means inserted within the shaft bore to reinforce said shaft under the bearings.

Another object of my present invention is to construct an improved engine shaft element of minimum weight and maximum strength by inserting a reinforcing plug within the shaft in the radial plane of the bearing to provide a rigid shaft structure resisting deflection under compression loads.

A further object of my present invention is to construct a shaft element of minimum weight and maximum strength, and one which may be supported in ordinary plain cylindrical bearings, by providing a reinforcing plug which may be inserted within the hollow interior of the shaft and located in contacting relation with the inner surface of that portion of the shaft underlying the bearing, in order to reinforce the shaft and minimize the tendency of such shafts to be distorted out of round when subjected to relatively high compression loads.

It will be observed that the present construction as hereinafter described in detail will eliminate the necessity of providing expensive and complicated bearing structures as are usually employed in engines of this character, thereby, providing a light-weight shaft structure for aircraft engines which can be economically manufactured.

For a more detailed understanding of my invention, reference may be had to the accompanying drawing illustrating a preferred embodiment of my invention and in which:

Fig. 1 is a longitudinal sectional view through a shaft and bearing support illustrating my invention, Fig. 2 is a transverse sectional view through the bearing and reinforced shaft section taken on the section line 2—2 of Fig. 1, Fig. 3 is a diagrammatic view illustrating the deflection of a tubular shaft section under compression loads, and Fig. 4 is a detailed sectional view illustrating a modified form of construction.

In the accompanying drawing, I have chosen to illustrate my invention embodied in an idler gear shaft, although it will be understood that the principles of my invention may be incorporated in other types of shafts if so desired. The present shaft 10 is formed hollow and is preferably provided with an internal bore 11 providing a wall section of minimum thickness, which is capable of transmitting the required amount of torque and resisting bending stresses because of the application of a load on an intermediate section of the shaft between spaced bearing structures.

The shaft in the present instance is provided with an enlarged section 12 forming a gear member 13, which is constructed for meshing engagement with a gear 14. A second gear 14a is mounted on said shaft intermediate the shaft bearings and is preferably secured or fastened to the flange 14b as shown in Fig. 1.

The engine structure includes certain structural frame members 15, which carry bearing supports 16 and 17. Plain cylindrical bearings or bushings 18 and 19 are respectively supported in these bearing supports 16 and 17. The shaft 10 carries at each end thereof, the bearing portions 20 and 21 which are respectively constructed for mounting within the plain bearings 18 and 19. Reinforcing plugs 22 and 23 are fitted in the internal bore of the shaft 10 at each end thereof and are respectively located to underlie the shaft portions 20 and 21. These plugs as shown in Fig. 1 comprise an annular channel shaped ring structure having webbed portions 24 and annular flange portions 25. These annular flange portions are constructed to be located or positioned within the tubular shaft in such a way as to have surface to surface contact with the internal surface of the tubular shaft portion, which is in operative engagement with the plain bearings 18 and 19. Preferably the internal bore of the shaft 10 is machined to provide shoulders 26 against which the plugs abut and the outer peripheral rim of each plug is provided with a distortable annulus 27 which may be peened outwardly into an annular groove 28 carried by the shaft, so as to permanently secure the plug within the tubular shaft.

Referring particularly to Fig. 3, it will be noted that this illustration shows an exaggerated deflection of the tubular shaft portion 20 under compression loads, as diagrammatically indicated by the arrows 29. The dotted line elliptical shaft designated by reference character 30 illustrates how this shaft is deflected or crushed under compression loads resulting in a deflection as indicated by $a$. This deflection of the shaft under load has been measured, and deflections as high as .012 of an inch have been noted. Such deflections which tend to distort the shaft out of round have a tendency to very quickly score or otherwise ruin the bearing which supports the shaft. Consequently it has been customary, heretofore, to provide strong expensive bearing structures for supporting these shafts, so that any deflection of the shaft into an out-of-round condition will not destroy or unduly wear the bearing.

I have discovered, that by using a shaft of minimum wall thickness and which is not sufficiently strong to withstand these compression loads without deflecting an excessive amount, the deflection of the shaft can be minimized by inserting a reinforcing plug as herein illustrated to reinforce that shaft portion lying within the bearing which supports same. After insertion of these plugs measurements were taken and a maximum deflection of .001 of an inch were noted and consequently this has made it possible to provide ordinary plain bearings or bushings for supporting this type of shaft. The insertion of these plugs has made it possible to machine or otherwise construct the entire shaft of minimum wall thickness to obtain a maximum saving in weight. The plugs are readily inserted and secured in place with a minimum of labor and expense and have added very little to the total weight of the shaft. In fact, the total weight of the shaft and plugs is much less than the shafts which have heretofore been employed in aircraft engines for similar applications.

In Fig. 4 I have illustrated a modified shaft construction in which the shaft portion 20a of shaft 10 is constructed to receive a pair of cup members 40 assembled back to back and abutted against the shoulder 26, and secured in place by means of an expanding lock spring or washer 41. These cup members each comprise a web portion 42 and annular flange portions 43 constructed to fit snugly within the internal bore of the shaft and to contact the internal surface of the shaft portion 20a underlying the plain bearing 18.

It will be further noted that the web portions of the reinforcing plugs are substantially positioned to lie in the plane of the bearing support, and these plugs are provided with annular flange portions contacting the shaft, and together have a length substantially the same as the length of the shaft bearing.

It will be obvious that various types of plugs may be embodied in various engine applications, the particular design and structure of the plug depending upon the total maximum compression loads to which the shaft is subjected. Obviously, one or more of these plugs may be employed as desired to meet the various conditions encountered in aircraft engine construction.

Although I have illustrated but one form of my invention and have described in detail but a single application thereof, it will be apparent to those skilled in the art to which my invention pertains, that various modifications and changes made be made therein without departing from the spirit of my invention or from the scope of the appended claims.

I claim:

1. A shaft structure comprising a tubular shaft member subjected to compression loads, a plain cylindrical bearing for rotatably supporting said shaft, and a continuous plug secured internally of said tubular shaft and located in radial alignment with respect to said bearing, said plug comprising a continuous annular channel member having peripheral flange portions constructed to provide a whole circle contact with the internal surface of said shaft portion in operative engagement with said bearing.

2. A shaft structure comprising a tubular shaft member subjected to compression loads, a plain cylindrical bearing for rotatably supporting said shaft, and a plug secured internally of said tubular shaft and located in radial alignment with respect to said bearing, said plug comprising a web portion and an axially extending annular flange portion constructed for surface to surface whole circle contact with the internal surface of said shaft portion in operative engagement with said bearing.

3. A shaft structure comprising a tubular shaft member subjected to compression loads, a bearing for rotatably supporting said shaft, and a plug secured internally of said tubular shaft and located in radial alignment with respect to said bearing, said plug comprising a pair of cup members assembled back to back and providing oppositely extending annular flange portions constructed for surface to surface contact with the internal surface of said shaft portion in operative engagement with said bearing.

4. A shaft structure comprising a tubular shaft member subjected to compression loads, a bearing for rotatably supporting said shaft, and a plug secured internally of said tubular shaft and located in radial alignment with respect to said bearing, said plug including a cup member having a web extending normal to the shaft axis and an annular flange portion peripherally contacting with the internal surface of said shaft underlying said bearing.

5. A shaft structure comprising a tubular shaft member subjected to compression loads, a bearing for rotatably supporting said shaft, and a plug secured internally of said tubular shaft and located in radial alignment with respect to said bearing, said plug coaxially aligned within said shaft and including a web portion extending normal to the shaft axis and a continuous annular flange peripherally contacting with the internal surface of said shaft underlying said bearing.

6. A shaft structure comprising a tubular shaft member subjected to compression loads, a bearing for rotatably supporting said shaft, and a plug secured internally of said tubular shaft and located in radial alignment with respect to said bearing, said plug comprising a pair of cup members assembled back to back and providing oppositely extending annular flange portions constructed for surface to surface contact with the internal surface of said shaft portion in operative engagement with said bearing, said annular flange portions extending to points substantially radially aligned with the ends of said bearing.

7. A shaft structure comprising a tubular shaft member subjected to compression loads, a bearing for rotatably supporting said shaft, and a continuous sleeve-like plug secured internally of said tubular shaft and located in radial alignment with respect to said bearing, a bearing support, said plug comprising a member having a web portion substantially aligned with the plane of the bearing support and a continuous annular flange portion constructed for surface to surface whole circle contact with the internal surface of said shaft portion underlying said bearing.

8. A shaft structure comprising a tubular shaft member subjected to compression loads, a bearing for rotatably supporting said shaft, and a continuous whole circle plug secured internally of said tubular shaft and located in radial alignment with respect to said bearing, said plug having a web portion and an annular flange portion in whole circle contact with the internal surface of the shaft portion underlying the bearing, said shaft internal bore having a shoulder forming an abutment to locate the plug and means securing said plug in place.

9. A shaft structure comprising a tubular shaft member subjected to compression loads, a bearing for rotatably supporting said shaft, and a plug secured internally of said tubular shaft and located in radial alignment with respect to said bearing, said plug having a web portion and an annular flange portion in contact with the internal surface of the shaft portion underlying the bearing, said shaft internal bore having a shoulder forming an abutment to locate the plug and means securing said plug in place, said means comprising a distortable annular lip distorted into locking engagement with said shaft.

JAMES W. KINNUCAN.